Oct. 7, 1969  C. C. SCOURTAS  3,470,718
WASHING MACHINE LOAD WEIGHING AND CONTROL APPARATUS
Filed Oct. 2, 1967  2 Sheets-Sheet 1

INVENTOR.
CHARLES C. SCOURTAS
BY
Fishburn, Gold & Litman
ATTORNEYS

United States Patent Office 3,470,718
Patented Oct. 7, 1969

3,470,718
WASHING MACHINE LOAD WEIGHING AND CONTROL APPARATUS
Charles C. Scourtas, Kansas City, Mo., assignor of one-half to Boring and Boring, Inc., Leawood, Kans., a corporation of Missouri
Filed Oct. 2, 1967, Ser. No. 672,300
Int. Cl. D06f 33/02
U.S. Cl. 68—12                 7 Claims

ABSTRACT OF THE DISCLOSURE

A washing machine having water and/or washing media inlet controls for introducing quantities of water proportioned to the amount of load to be washed, and a load receiving platform movably mounted when in weighing position to move in response to the load thereon with an electric circuit having relays and switches operatively connected to the load weighing platform to activate the water control. Circuitry including an overload position whereby the machine and media supply thereto is inoperative until the excess of load is removed from the platform. The weighing platform being a cover to the access opening of the washing chamber, which cover is hingedly mounted on the body of the machine or cabinet and swingable to one side to weighing position, said machine including detergent or other washing media supplies which are selectively actuated for delivery of proper proportions ot the washing load weighed on the weighing platform.

---

Washing machines, particularly clothes washing machines, and the like, have definite limits on the weight of a single load that may be washed. Also, it is desirable to have water and washing media proportioned to the load, as for example, the load may be a light load, medium load, or a full load, and when washing less than a full load, it is desirable that the water and detergent be proportioned thereto for better washing and the economy by the use of lesser amounts of water and media. Heretofore washing machines have selective controls for the delivery of water to the washing compartment whereby the operator, by judgment, could estimate the size of the load and then actuate the control to initiate the introduction of the selected amount of water, the water delivery being shu off by a level responsive member such as a pressure switch when the desired quantity thereof is in the washing compartment and then the cycle controls operated to continue the various conventional steps of the washing cycle until completed. Even if the operator knew the weight of the load, such operation still required the manual selection of the amount of water and washing media to be introduced and thereby was subject to error.

The principal objects of the present invention are to provide a washing machine with controls responsive to the weight of a load to be introduced whereby the quantity of water introduced to the washing chamber is automatically selected; to provide such a washing machine wherein the cover for the access opening of the washing chamber serves as a scale platform in the weighing of the articles to be washed; to provide such a structure wherein the cover or lid of a top opening washing machine is free to swing to and from closing position, and when in open position engages resilient supported members movable in proportion to weight applied to the lid, said members being operatively connected to switches to actuate same and complete a circuit to the water and/or media controls for introduction of the respective amount thereof for washing the load on the lid; to provide such a machine with an overload position in which the machine is inoperative until the excess load is removed from the lid; to provide such a machine wherein the water and media quantity is selected by weight responsive elements and then the machine is started and the clothes moved from the cover into the washing chamber; and to provide a washing machine with a load weighing apparatus and controls responsive thereto for proportioning water and washing media to the load that is efficient, accurate and facilitates proper washing of clothes and the like.

Other objects and advantages of this invention will become apparent from the following description taken in connection with the accompanying drawings wherein are set forth by way of illustration and examples certain embodiments of this invention.

Figure 1:
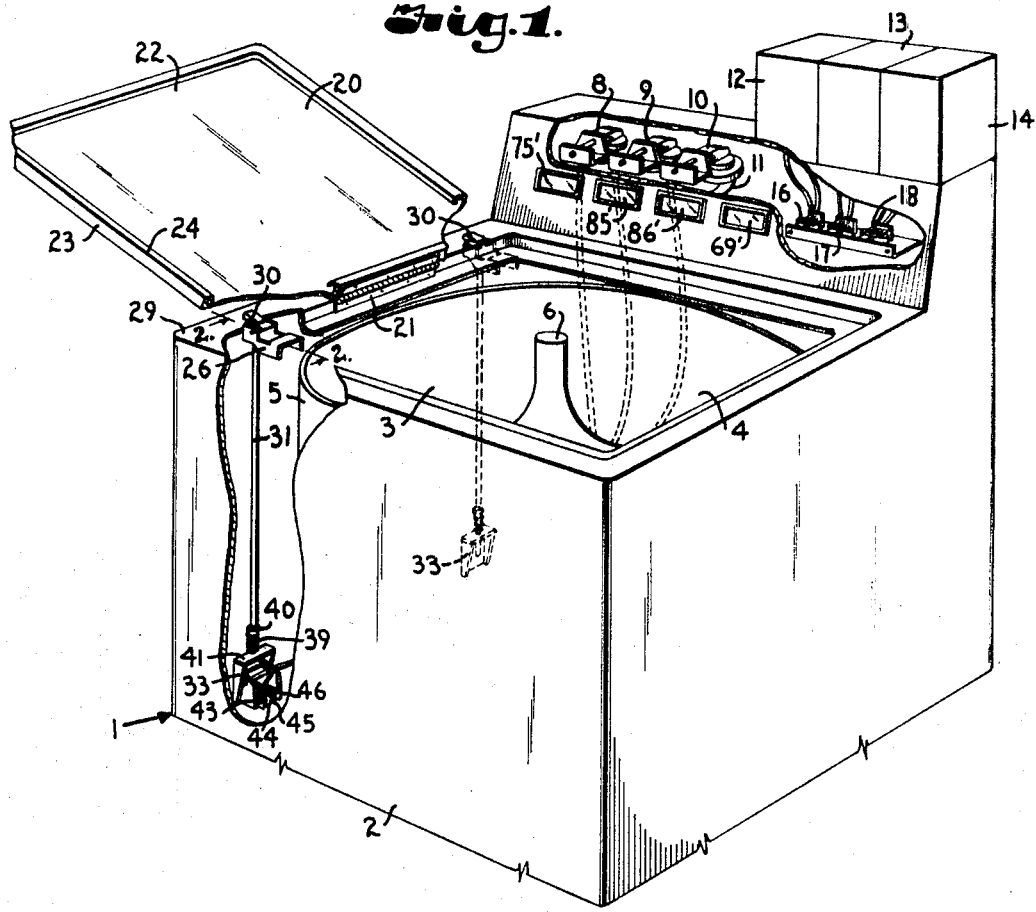
FIG. 1 is a partial perspective view of a washing machine embodying the features of the present invention with the cover in load receiving position.
Figure 2:
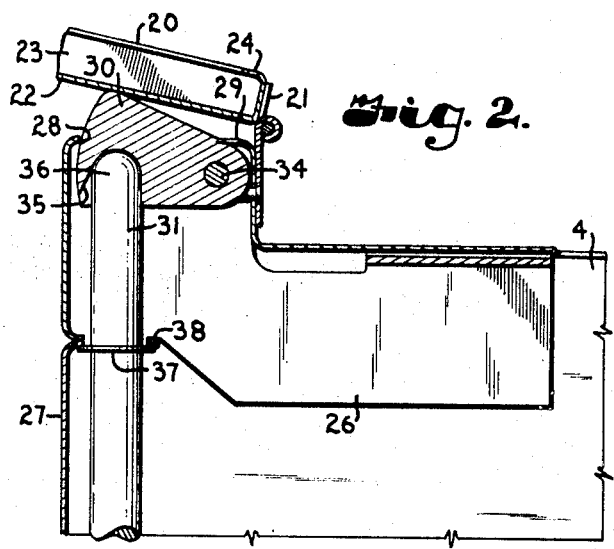
FIG. 2 is a partial detailed sectional view through the weight actuated members taken on the line 2—2, FIG. 1.

Referring more in detail to the drawings:

Reference numeral 1 generally designates a washing machine for washing articles such as clothes and the like, and includes a body or housing 2 with an opening 3 for access to a washing compartment 4 having a tub 5 therein with a suitable agitator or the like 6 which is oscillated or otherwise moved by a suitable motor or the like (not shown) for washing clothes in the tub. The body or housing, tub, agitator, and drives may be of any conventional structure of a clothes washing machine in which water and clotes are introduced into the washing compartment with a suitable control cam and circuitry for effecting the filling agitating, draining, refilling with rinse water, draining, in a cycle with the tub being spun at the end thereof for removal of water from the clothes. Since these portions of the machine are conventional, the details thereof are not shown. In such structures there is a timing motor 7 which drives the cam or cams for operating the components of the cycle controls and when such controls call for water, the water supply valve of solenoid type is energized to open and water is introduced into the washing compartment until a predetermined level is reached, actuating a pressure responsive switch to interrupt the circuit to the water control valve causing same to close. In such machines there are pressure responsive switches for different levels, such as switches 8, 9, and 10, respective to a predetermined low load water level, medium load level, and a full load level, respectively, for interrupting the circuit to the fill valve, the pressure responsive switches being connected through an air manifold 11 to a sensor (not shown) in the washing compartment.

In the structure illustrated, the washing machine also has detergent containers or hoppers 12, 13, and 14 provided with ducts 15 leading to the washing compartment with a detergent delivery effected by actuators or operators 16, 17, and 18, respectively, for effecting a delivery of a suitable quantity of detergent for a low load, medium load, and full load, respectively. The present invention has a structure for receiving a load of articles to be washed with mechanism responsive thereto and operatively connected to the controls for the water and detergent to actuate the respective control for the proper amount of water and detergent delivery to the washing compartment in accordance with the weight of the articles to be washed. While a separate weighing platform could be utilized, in the structure illustrated, the cover 20 for the opening 3 serves as the article weighing platform when it is in a full open position. The cover 20 is hingedly mounted as by hinge structure 21 to the body or housing 2 at one side of the opening 3 whereby said cover may be swung from an opening closing position to an inverted open position at one side of the opening. In the open position the cover has a load receiving wall 22 with upstanding peripheral wall 23 terminating in an edge or flange 24. The wall and the flange upstanding from the wall 22, when in open position, aid in holding the articles thereon. The cover is resiliently supported in the article weighing position to permit predetermined downward swinging movement in response to weight of articles placed thereon.

In the structure illustrated, brackets 26 are arranged in spaced relation in the housing between a side wall 27 and the adjacent edge of the opening 3 at the side having the hinge of the cover, said brackets are suitably fixed to the housing below respective spaced openings 28 in a top wall 29 of the housing. Cover engaging members 30 have portions extending through the respective openings 28 whereby weight of articles on the cover apply force to the members 30 which is transmitted downwardly by means of rods 31 which have lower ends extending through openings in brackets 33 fixed to the side wall 27. In the structure illustrated, the members 30 are pivotedly mounted on pivot pins 34 carried by the brackets 26 whereby the members 30 can swing downwardly, the lower portion of the members 30 having recesses 35 in which the upper ends 36 of the rods 31 are received. The rods have abutments or collars 37 adapted to engage stops 38 on the bracket 26 when the rods are in uppermost position and in that position the members 30 are held upwardly, substantially closing the openings 28. The upper force therefor being applied by springs 39 sleeved on the rods with one end engaging the bracket 33 and the other end engaging a collar or abutment 40 on the rods to provide an upwardly biasing force on the rods and members 30. The springs are such that when an empty cover is resting on the members 30 the springs support same without depression. The weight of articles to be washed placed on the cover apply downward force on the rods so as to have a predetermined movement in response to the change in weight. One of the rods 31 is operatively connected to a switch structure 41 that includes a plurality of switch arms 43, 44, 45, and 46, that are moved simultaneously in response to the placing of weight on the cover when the cover is in inverted position, as shown in FIG. 1.

Figure 3:
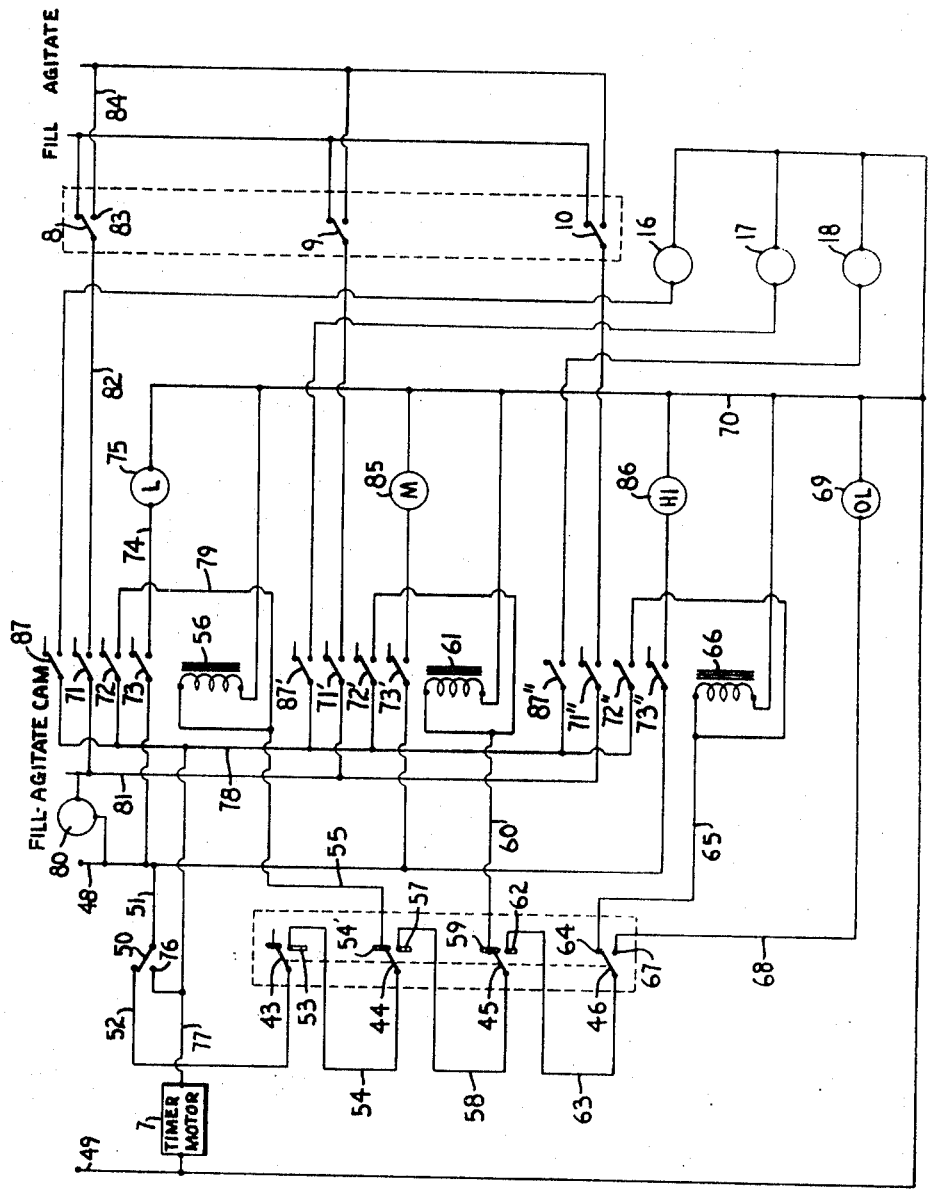
FIG. 3 is a diagrammatic view of the electric circuit for delivery of water and washing media in response to the load to be washed.

The switch structure 41 is connected in an electric circuit that is associated with the usual control circuitry of the washing machine to actuate the proper water and washing media controls. The circuit is illustrated in FIG. 3, and includes leads 48 and 49 connected to a suitable source of current such as 110 volt A.C. supply. The circuit includes a master switch 50 connected by a line 51 to the lead 48. The switch 50 prior to the starting of the washing machine is engaged with a contact to a line 52 that leads to the arm of switch 43, said arm when no weight is on the cover being in open circuit position, as illustrated in FIG. 3. When a weight within the low range load is applied to the cover it swings downwardly and through a member 30 and rod 31 moves the switch arms whereby the arm of the switch 43 engages a contact 53 which is connected by a line 54 to the arm of the switch 44, which in the low load range remains in circuit making position with a contact line 55 connected to a relay 56. When the load is in the medium range the switch arms are moved further with the arm of switch 43 engaging the contact 53 and the arm of the switch 44 engaging a contact 57 connected by a line 58 to the arm of the switch 45 which in the medium range position is in circuit making engagement with a contact 59 connected by a line 60 to a relay 61. When a full load range of articles is applied to the cover the switch arms are moved further at which position the arm of the switch 43 engages the contact 53, the arm of the switch 44 engages the contact 57, and the arm of the switch 45 engages a contact 62, which is connected by a line 63 with the arm of the switch 46 which in the full load range is in circuit making position with a contact 64 connected by a line 65 to a relay 66. If the load is excessive, the switches are further moved so that the arms of the switches 43, 44, and 45, are engaged with contacts 53, 57, and 62, respectively, and the arm of the switch 46 engages a contact 67, and in this position the circuit to the lines 55, 60, and 65, are opened. The contact 67 is connected by a line 68 through a signal light 69 to a line 70 that connects with the lead 49 to complete the circuit, said signal light 69 being an overload signal visible through a window 69' in the housing. In that position, all circuits that could effect a filling of the machine with water are open and even if the switch 50 is moved to start the timer motor 7, no water would be delivered to the washing compartment. If the excess articles are removed from the cover the switch structure returns to the position which is proper for the range of the weight of the clothes remaining.

If the load is in the low range, the arms of the switches 43 and 44 engage the contacts 43 and 54' whereby current can flow from the lead 48 to the switch 50, switches 43 and 44 and line 55 to the relay 56 energizing same to move switches 71, 72, and 73 whereby the switch completes a circuit through a line 74 from the lead 48 through a signal bulb 75 and through the line 70 to the lead 49, the signal light being visible through a window 75' on the housing. Then the operator moves the master switch 50 to engage contact 76 connected to a line 77 to energize the timer motor 7 which line 77 also runs to a line 78 connected to the switch 72 to complete a circuit through a line 79 to the relay 56 to hold same with the switches 71, 72, and 73 in circuit making position. The line 78 connects to switches of the other relays but they are in open position. The lead 48 is connected to a control 80 which through the fill agitate cam therein completes a circuit to a line 81 which connects through the switch 71 and line 82 to the pressure switch 8 to complete a circuit through the line 82 to the water inlet control valve (not shown). When the water reaches a predetermined level it actuates the pressure switch 8 moving same to engage contact 83 breaking the circuit to the fill valve closing same and completing the circuit through a line 84 to the motor (not shown) of the agitator. Continued operation of the washing machine is then in the conventional manner through control of the timer motor and sequence control to complete the washing, rinsing and drying.

For a medium load with the switch 50 completing a circuit to the line 52, the arms of the switches 43, 44, and 45 are arranged whereby they engage contact 53, 57, and 59, thereby opening the circuit to the relay 56 and completing the circuit to the relay 61 which moves switches 71', 72', and 73' to circuit making position whereby the switch 73' completes a circuit through the the signal bulb 85 which is visible through a window 85' on the housing. The circuit is completed through the switch 72' to the winding of the relay 61 to hold it in circuit making position and the circuit through the switch 71' is completed to the pressure switch 9 whereby the same operation is performed to fill the washing compartment with the proper amount of water for a medium load, the switch 9 then being actuated to break the circuit to the water valve and make the circuit to the agitator motor (not shown).

With a full load, the switch structure 41 is further moved, opening the circuit to the relay 61, the arm of the switch 45 engaging the contact 62, the arm of the switch 46 engaging the contact 64 to complete the circuit through the line 65 to the relay 66 which actuates switches 71", 72", 73" to move same in circuit making position whereby the switch 72" completes the circuit to the relay winding of the relay 66 to hold same in position and completes the circuit through the switch 73" to a signal bulb 86 which is visible through a window 86' on the housing signalling the high load. When the switch 50 is moved to start the timer the circuit is made through the fill agitator cam control to the pressure switch 10 to energize the fill valve to continue filling the washing compartment until the proper amount of water is therein with the pressure sensitive switch 10 being then actuated to open the circuit to the fill valve causing same to close and closing the circuit to the agitator motor.

With the structure as described, the operation could be effected with manual introduction of detergent, however, it is preferred that the detergent from the containers 12, 13, and 14 be selectively delivered in response to the weight. This is effected by means of the discharge controls 16, 17, and 18 for the low, medium, and high load washing, respectively, being energized by respective switches 87, 87', and 87" actuated by the relays 56, 61, and 65, respectively. The delivery controls 16, 17, and 18 are of a metered delivery type which after delivery of the detergent from the respective container remains inactive until the circuit to the respective relay is broken and the switch activated thereby is returned to its original position.

In the operation of an apparatus constructed as described with the washing machine connected to a source of hot and cold water as in normal procedure and to a source of current, with detergent in the containers 12, 13, and 14, the operator swings the cover to open position, as illustrated in FIG. 1. The cover is then supported on the members 30 through the rods 31 and springs 39. Articles to be washed are then placed on the inverted cover with the weight thereof forcing the members 30 and rods 31 downwardly to move the switch structure 41 with the switches completing the circuits in accordance with the load depending upon the range in which the load falls, i.e., low, medium, or high. If it is an overload, the signal light 69 will so indicate and no washing operations are then possible. When a proper load is on the lid the respective signal light indicates the range of said load, as for example, the light 85 indicates a medium load, then the operator moves the switch 50 which starts the machine, energizing the timer motor and fill agitate cam controls thereby starting the water to flow into the washing compartment and actuating the proper detergent delivery control to apply the detergent to the washing compartment. The operator then merely raises the cover and the clothes move into the tub 5 around the agitator 6, the cover is closed and the washing machine proceeds to operate through its cycles for the load introduced therein. This arrangement eliminates all guess work and possibility of error thereby assuring more efficient washing with economy.

What I claim and desire to secure by Letters Patent is:

1. In a washing machine having a body and an opening therein through which articles to be washed are placed in the body and having washing media supply ducts for introduction of washing media into said body, a control for the washing media for proportioning same in accordance with the load of articles to be washed comprising,
    (a) a platform movably mounted relative to the body and adapted to receive articles thereon to be washed, said platform being a cover for the top opening and hinged relative to the body for swinging from closing position to a substantially inverted position at one side of the opening,
    (b) biasing means urging said platform upwardly in its load receiving position and permitting downward movement in response to weight of articles thereon,
    (c) means actuated by said platform in response to weight thereon and having a series of positions for respective ranges of weights, said means including an electric circuit having a plurality of switches and respective relays with the switches interconnected to energize the respective relay in accordance with the weight on the platform,
    (d) said circuit including connections for the respective relays to the washing media control to actuate same,
    (e) means connected to said control means and operated in response to energization of relays for the respective positions of the weight actuating means for effecting delivery of the relative amounts of washing media for the load of clothes to be washed.

2. In a washing machine having selective controls for delivery of water to a washing tub for different loading of clothes to be washed,
    (a) a platform for receiving a load of clothes to be washed,
    (b) means supporting said platform and permitting predetermined movement in response to weight of clothes thereon,
    (c) an electric circuit connected to the selective controls and including a plurality of switch means progressively engaged in response to increase of weight of clothes on the platform for actuating a respective water control for delivery of an amount of water to the tub for washing the load of clothes on the platform when moved to the tub.

3. A structure as set forth in claim 2 and including
    (a) an overload position of the switch means in which circuits to the control are open,
    (b) a signal actuated in response to movement of the switch to the overload position to indicate excessive weight on the platform.

4. A structure as set forth in claim 2 wherein the machine includes an open top housing for access to a washing tub and the platform is a cover hinged on the housing movable from a top opening closing position to a substantially inverted position at one side thereof.

5. A structure as set forth in claim 4 and having an elongated switch actuating means connected to the switches with a structure at the opposite end adapted to be engaged by he cover when in inverted position, said elongated member being biased toward the cover and stop means to limit the movement toward the cover.

6. In a washing machine having a housing and a tub assembly including,
    (a) an agitator structure operable to wash clothes in said tub,
    (b) said housing having an opening providing access to said tube for introducing clothes to be washed,
    (c) a water supply connected to a water source,
    (d) control means connected to said supply and selectively operable for delivery of desired quantities of water to said tub,
    (e) a cover for said top opening of the housing hinged thereon and swingable from a closing position to a substantially inverted position at one side of said opening,
    (f) a plurality of interconnected switches in said housing,
    (g) actuating means connected to said switches and extending therefrom toward said cover and adapted to be moved in response to weight on said cover,
    (h) stop means limiting the movement of said actuating means toward the cover,
    (i) biasing means urging said actuating means toward the cover and providing support whereby said actuating means has a predetermined movement imparted thereto in response to weight of clothes on the cover effecting circuit making position of the switches, (j) an electric circuit connected to the water control means and having relays energized by the respective switches for effecting delivery of water to the tub in predetermined relation to the weight on the cover, (k) and a timer motor in the circuit for continued energization of the washing cycle.

7. A structure as set forth in claim 6 and including (a) an overload signal indicating excessive weight on the cover, (b) an overload position of the switches in which circuits to the controls are interrupted and the overload signal is energized.

References Cited

UNITED STATES PATENTS 2,554,672  5/1951  Johnston _____ 68—12

WILLIAM I. PRICE, Primary Examiner

U.S. Cl. X.R.

68—196; 137—387